United States Patent [19]

Iversen

[11] Patent Number: 5,069,025
[45] Date of Patent: Dec. 3, 1991

[54] AIR FLOW DIRECTING DEVICE

[76] Inventor: Ernst W. Iversen, 2807 Garrett Dr., Bowling Green, Ky. 42101

[21] Appl. No.: 325,892

[22] Filed: Mar. 20, 1989

[51] Int. Cl.[5] ............................................. A01D 55/18
[52] U.S. Cl. .......................................... 56/295; 56/13.4
[58] Field of Search ....................... 56/13.3, 13.4, 295

[56] References Cited

U.S. PATENT DOCUMENTS

| 1,656,105 | 1/1928 | Durkee | 56/295 |
|---|---|---|---|
| 3,049,855 | 8/1962 | McMillan | 56/295 |
| 4,121,405 | 10/1978 | Wolf | 56/295 X |
| 4,129,977 | 12/1978 | Comer | 56/295 X |
| 4,213,289 | 7/1980 | Kamppinen | 56/295 |
| 4,426,831 | 1/1984 | Klas et al. | 56/295 |
| 4,559,769 | 12/1985 | Seyerle | 56/295 |

Primary Examiner—William P. Neuder
Attorney, Agent, or Firm—Edward M. Steutermann

[57] ABSTRACT

A flow directing device for use with rotary blade mowers where the blade is located for rotation in plane generally parallel to a surface to be cut and where the devices within the scope of the present invention include an air flow direction vane having a base located on the underside of the central portion of the blade with upstanding vanes on the leading side of the blade where each of the vanes is tilted inwardly over the blade and has a tip at the edge which is turned outwardly toward the front edge of the blade.

3 Claims, 1 Drawing Sheet

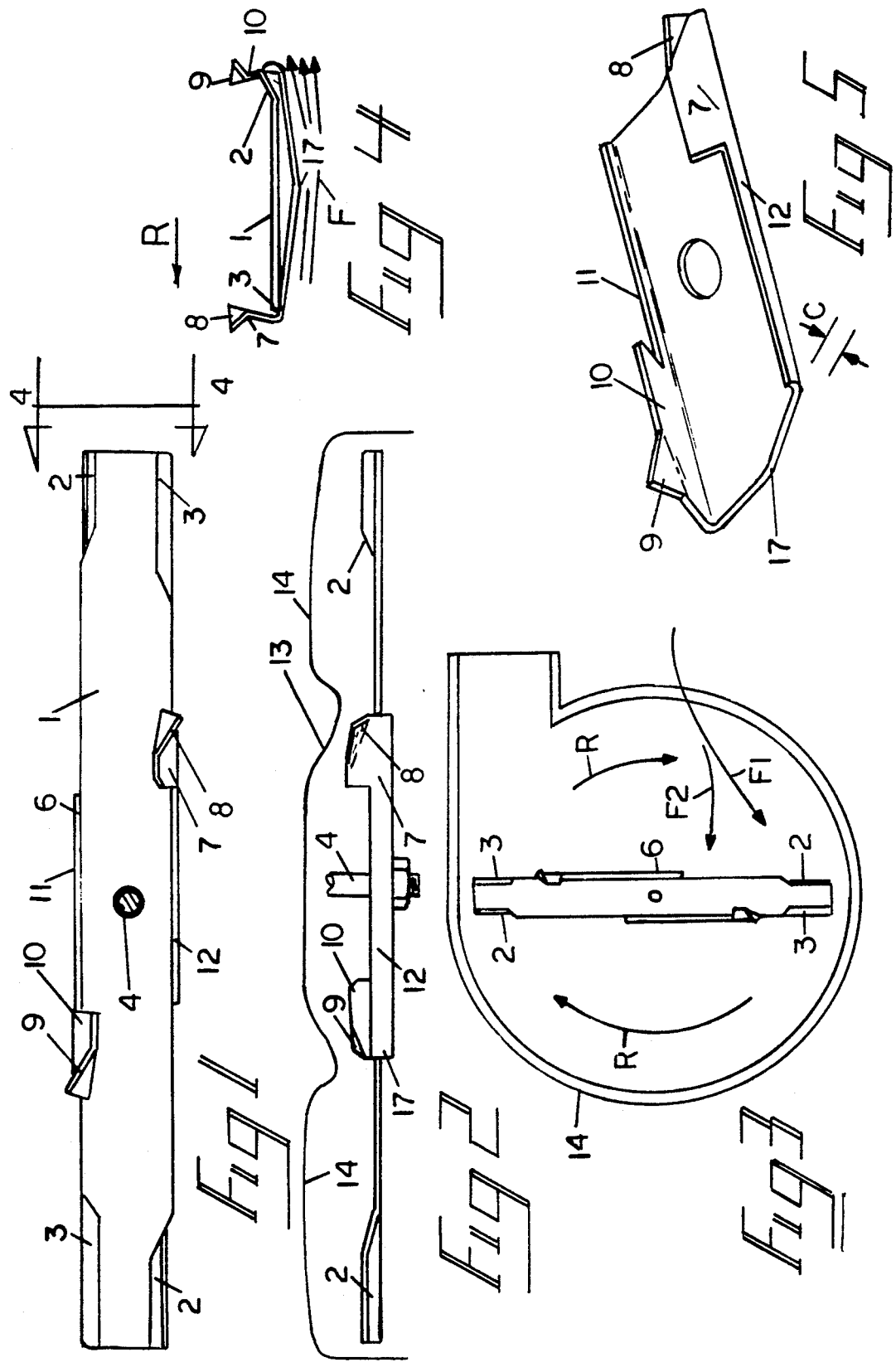

AIR FLOW DIRECTING DEVICE

BACKGROUND OF THE INVENTION

The present invention relates, in general, to mower device and more particularly relates to devices for improvement of operation of rotary blade mowers.

Rotary mowers are widely used for clipping grass, in both commerical and domestic applications. However, the devices have well known problems which include problems associated with attempts to cut damp grass. In the case of clipping damp grass the clippings tend to accumulate in the mower housing and impede the emission of grass through the chute which is provided in most mower housing.

Various prior art arrangements have addressed the problems commonly associated with the use of rotary mowers and some of the references include U.S. Pat. No. 3,049,855, which provides vertically upstanding fins on opposite sides of the blade, U.S. Pat. No. 4,121,405 relates to the use of an impeller blade separate from the cutting blade to facilitate movement of air through the device; U.S. Pat. No. 4,213,289 teaches a separate impeller device which can be located on a blade but which provides upstanding fan blades which are angled outwardly from the edges of the mower blade and which are tilted outwardly even further from the mower blade contrary to the present invention.

No prior art arrangement is known which recognizes the benefits of devices within the scope of the present invention.

SUMMARY OF THE INVENTION

The present invention provides a new, useful and inexpensive modification for mower blades which can be either integral with the blade or where devices can be easily retrofit to generally available mower blades.

Devices within the scope of the present invention provide a cambered lower surface beneath the blade and upstanding vanes located on the leading edge of either side of the blade. The vanes are inwardly turned over the blade and have outwardly directed tips.

It has been found that the devices within the scope of the present invention provide a synergistic effect on the flow of air through a mower housing which not only provides a greater air flow to propel the grass clippings out of the housing, but also provides unique air circulation within the housing to both prevent accumulation of clippings in the housing also greatly reducing the tendency of cloging the discharge opening and further unexpectedly provides means whereby grass growing over a paved surface such as walks and driveways is maintained in more upright condition during the mowing operation to provide to smoother more even cut. Devices within the scope of the present invention have also been found to be particularly effective to remove leaves and debris from the ground during mowing. In fact, devices within the scope of the present invention accoplish a degree of dethatching, that is removal of dead grass, ususally clippings, from the area being cut.

Briefly, the present invention provides a flow directing device for use with rotary blade mowers where the blade is located for rotation in plane generally parallel to a surface to be cut and where the devices within the scope of the present invention include an air flow direction vane having a base located on the underside of the central portion of the blade with upstanding vanes on the leading side of the blade where each of the vanes is tilted inwardly over the blade and has a tip at the edge which is turned outwardly toward the front edge of the blade. Examples within the scope of the present invention are illustrated in the accompanying drawingsd and described hereinafter but it will be understood that the illustrations and the description provided herein are by way of example only and that various other arrangements also within the scope of the present invention will occur to those skilled in the art upon reading the disclosrue set forth hereinafter.

BRIEF DESCRIPTION OF THE DRAWINGS

Referring to the illustrations of an example of an apparatus within the scope of the present invention as illustrated in the accompanying drawings:

FIG. 1 is plan view of an example of a device within the sope of the present invention located on a rotary mower blade;

FIG. 2 is plan view of a blade in FIG. 1 with an illustration mower housing;

FIG. 3 an topside plan view of the blade of FIG. 1 located in a housing;

FIG. 4 is a view taken along a plane passing through 4—4 of FIG. 1; and

FIG. 5 is a perspective view of one example of an arrangement within the scope of the present invention.

DETAILED DESCRIPTION OF THE DRAWINGS

The arrangement shown in the Figures illustrate, as previously stated, only one example of arrangements within the scope of the present invention.

FIG. 5 is a perspective view of a device within the scope of the present invention which is easily adapted for attachment to existing mower blade. However, it will be understood that within the scope of the present invention a complete mower blade could be produced having the features of the present invention and likewise be within the scope of the present invention.

Referring first to FIG. 5, the device within the scope of the present invention illustrates cambered lower surface 17 which has been unexpectedly found to provide enhanced performance, apparently by providing an area of reduced pressure aft of at the center of the blade on the lower side of the blade. The degree of "Camber" is variable depending upon the particular circumstances encountered, and the particularly the mower and housing configuration. Any degree of camber has been found to improve operation, and camber has be found to operate synergistically with the effects provided by the vanes 7 and 10 which extend upwardly on opposite side of the blades as shown in FIGS. 1, 3, and 4.

Vanes 7 and 10 are turned inwardly over the blade as shown in FIG. 1 and have outwardly extending tips 8 and 9 respectively. It is the combination of the inwardly turned vane and outwardly turned tip which appears to provide the beneficial effects encountered in connection with the present invention and particularly the scrubing effect which prevents the accumulation of grass clippings within the housing. The combination of the camber 17 and vanes 7 and 10, including the tips 8 and 9 also enhances air flow through the device and holds grass in an upright position leading to a more uniform cut and better appearance. The degree of inward tilt of the vanes 7 and 10 can be varied depending again upon particular circumstances including the mower size and the application. In general inward tilt in the order of "0" to 45° has been found satisfactory with an inward tilt in the range of 0° to 15° appearing to be preferable.

Referring to FIG. 1, which shows the attachment 6 of FIG. 5 located on a mower blade 1, the blade, as is known in the art, includes cutting edges 3 on opposite ends of the blade where each of the cutting edges 3 is on a leading edge of the blade as the blade rotates in a direction "R" as shown in FIG. 3. The attachment 6 within the scope of the present invention is connected to the blade and held in place on the drive shaft 4 by means of a nut or other suitable arrangements. Lips 11 and 12, as illustrated in FIGS. 1 and 5, are provided to engage opposite edges of the blade to prevent relative rotation between the blade and the deflector assembly 6.

As can be seen the vanes 7 and 10 are located over front edges of the blade 1 with the tips 8 and 9 extending outwardly therefrom and from the same side of the blade relative to the drive shaft as the cutting edge so that the vanes 7 and 10 are located on the respective leading edges of the blade.

While not a part of the present invention, the blade 1 is also illustrated as having upturned deflectors 2 on the trailing edges of the blades. The upturned deflectors 2 have been found in the prior art to enhance operation of the mower blade by increasing air flow through the housing.

FIG. 2 is an illustration of the blade 1 of FIG. 1 with device 6 within the scope of the present invention located thereon and the blade located in a mower housing 13. The upper surface 14 of the housing is the area in which grass typically accumulates in most prior art arrangements and where accumulation is prevented in devices within the scope of the present invention.

As shown in FIG. 3 the blade rotates in a direction "R" with the device 6 within the scope of the present invention as described hereinbefore in place. While air flows into the device from various sources it is understood that air flow also occurs as shown by the arrows F1 and F2. The air flow F1 is induced by the upturned deflectors 2 while the flow F2 toward the center of the device is induced by the device itself. It is the air flow F2 and its associated currents which have the most significant beneficial effect experienced by devices within the scope of the present invention. FIG. 4 also illustrates one aspect of the flow "F" across cambered underside 17 of the device which it is believed leads to the unexpected dethatching benefits provided by devices within the scope of the present invention.

FIG. 4 is a view taken along a line passing through 4—4 of FIG. 1 and illustrates, generally an end view of the devices showing the orientation of the various elements in accordance with the present invention.

It will be understood that the foregoing is but one example of an arrangement within the scope of the present invention and that various other arrangements also within the scope of the present invention will occur to those skilled in the art upon reading the disclosure set forth hereinbefore.

The invention claimed is:

1. A flow directing device for use with rotary blade mowers having a blade with cutting edges adjacent the tip thereof on the leading edge of said blade and where said blade is located for rotation in a plane generally parallel to a surface to be cut and where a device within the scope of the present invention is provided for rotation with said blade and includes an air flow direction vane to be located on the underside of the central portion of the blade having a base cambered away beneath said blade to provide an air foil to generate a low pressure zone beneath said device when said blade is in rotation and where said blade is provided with upstanding vane means on at least one side of said blade where said vane means are located on the leading edge of said blade inwardly of said cutting edge and wherein said vane means is tilted inwardly over the blade.

2. The invention of claim 1 wherein said upstanding vane has a tip at the edge thereof on the end of said vane located closest to said cutting edge which is turned outwardly toward the leading edge of the blade.

3. The invention of claim 1 including retainer means carried by said base of said device and adapted to extend upwardly from the edges thereof to engage the edges of said blade to prevent independent rotation of said device relative to said blade.

* * * * *